Patented May 1, 1934

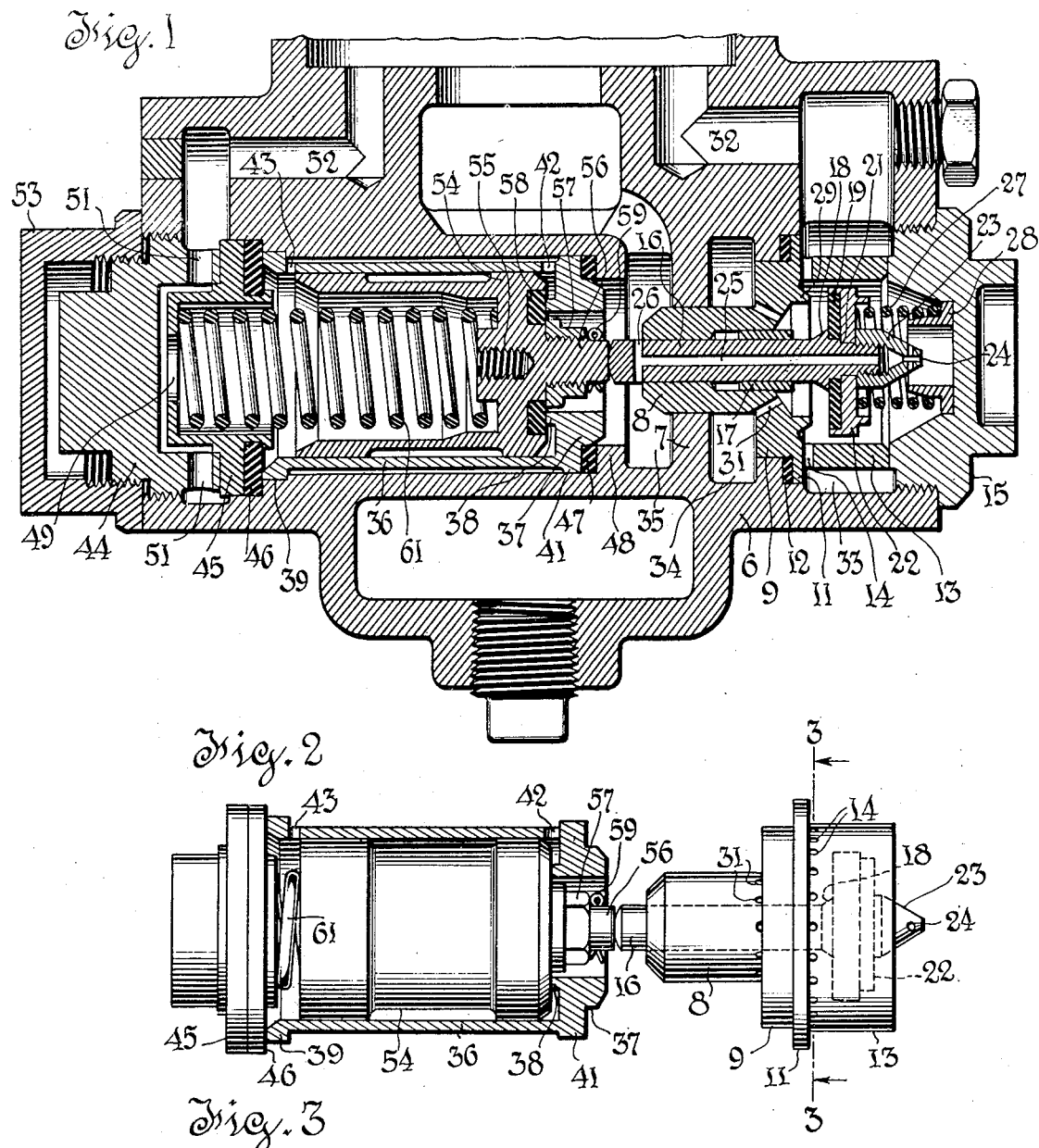

1,956,666

UNITED STATES PATENT OFFICE 1,956,666

AIR BRAKE

Charles A. Campbell, Watertown, N. Y., assignor to The New York Air Brake Company, a corporation of New Jersey Application September 4, 1931, Serial No. 561,289

11 Claims. (Cl. 303—84)

This invention relates to air brakes and particularly to devices for controlling the flow of air from the triple valve to the brake cylinder to impart special pressure rise characteristics to brake cylinder pressure during applications.

Devices of this character are commonly called "delayed build-up devices" and their operation is usually confined to emergency applications.

The present application is directed and limited to the structural features of the valve. The valve is susceptible of use in more or less modified form in combination with a number of different triple valve structures, the form of the triple valve and associated mechanism determining the operative characteristics of the build-up valve. Such combinations are neither disclosed nor claimed herein, but are regarded as independent inventions.

The preferred embodiment of the invention is illustrated in the accompanying drawing, in which:—

Fig. 1 is a vertical section taken through the housing on the axis of the delay valve and actuating piston.

Fig. 2 is a view partly in elevation and partly in section showing the valve seat and cylinder bushings removed from the housing with the piston and valve in place.

Fig. 3 is a section on the line 3—3 of Fig. 2.

In the drawing, 6 represents a portion of the body of a valve mechanism, commonly a triple valve. This body is bored out from opposite sides to a partition 7 which has a central aperture. The two bores are alined, and one receives the valve seat bushing, and the other a cylinder bushing.

The valve seat bushing has a hub 8 which fills the opening in partition 7, a head 9 which centers the bushing in the bore in body 6, and a flange 11 which seats on a gasket 12 to seal the bushing in the body. On head 9, on the side remote from hub 8 is an annular sleeve projection 13 provided with a large number of drilled ports 14 close to flange 11. The bushing is held in place by a threaded plug 15 screwed into body 6 and seating in sleeve 13. The plug 15 makes an airtight seal with body 6.

The bushing has an axial guideway for the stem 16 of the delay valve. The guideway is bushed as indicated at 17. The stem 16 is shouldered at 18 to confine a gasket 19 and is shouldered at 21 to limit the compression exerted on the gasket 19 by valve disc 22. The disc 22 has a peripheral flange which confines the edge of gasket 19, and is held in place by a cap nut 23 which is formed with a flow restricting passage 24 leading to port 25 which extends longitudinally through stem 16. A cross port 26 leads from port 25.

The valve is urged in a closing direction by a coil compression spring 27 confined between disc 22 and a spring seat 28 centered in plug 15. The seat bushing has a seat bead 29 for gasket 19 and within this bead are a number of ports 31 which lead through head 9.

A passage 32 brings air from a port in the triple valve (usually the emergency port) to the space 33 around sleeve 13. Thence it flows through ports 14 to the space to the right of head 9. The space 34 to the left of head 9 communicates by way of a passage not visible in the drawing with the brake cylinder. Hence when valve 19 is unseated, air can flow freely from the triple valve through port 32 and space 33, ports 14 and 31 to chamber 34, and thence to the brake cylinder. Thus space 34 is part of and communicates with this main flow passage to the brake cylinder.

The space 35 to the left of partition 7 is also connected with the brake cylinder, so that when valve 19 is closed, air flows at a restricted rate (determined by port 24) from the triple valve to the brake cylinder by way of port 32, chamber 33, ports 14, 24, 25, 26, and 35 to the brake cylinder.

It will be observed that the spaces 34 and 35 at opposite sides of partition 7 are both connected with the brake cylinder. The function of partition 7 is to prevent air rushing through ports 31 when the valve is open from affecting the actuating piston mechanism now to be described. Except for this, spaces 34 and 35 might be in free communication with one another. The space 35 is thus primarily part of a pressure transmission passage to cause brake cylinder pressure to act on the piston. When valve 19 is closed, it does act also as part of a restricted flow passage to the brake cylinder, but, from the broad operative standpoint, this is immaterial as the restricted flow could as well be directed through space 34, as will be obvious.

Inserted in the second bore is a cup-like bushing 36 having a head 37 ported at its center and provided around said central port with a valve seat bead 38. The middle portion of the bushing 36 is reduced in outside diameter, leaving beads 39 and 41 which center the bushing in the bore which receives it. Two ports lead through the bushing 36, one port 42 close to head 37 and the other 43 near the opposite end, but both communicating with the reduced external portion between beads 39 and 41.

The bushing 36 is held in place by a threaded plug 44 which engages a cup-like spring seat 45. This supports a gasket 46 against which the outer end of bushing 36 seats. The inner end seats on a gasket 47 supported by flange 48 on body 6. There is a central port 49 in spring seat 45 and a series of radial ports 51 in plug 44, so that the space within bushing 36 communicates through ports 49 and 51 with a passage 52. This passage may lead to atmosphere or may be valve-controlled, according to operative features with which the present invention is not concerned.

A cap nut 53 threaded on plug 44 seals the plug air-tight in body 6.

Slidable in bushing 36 is a cup-shaped piston 54. This is slightly reduced at its middle portion, as shown. It is provided at 55 with a threaded hole to receive a puller-tool to facilitate withdrawal of the piston when dismounting the device.

The piston 54 has, projecting from its head, a threaded stem 56 which engages valve stem 16. A nut 57 on this stem confines a gasket 58 in a groove, formed in the piston head to receive it. This gasket normally seats on bead 38. A cotter pin 59 ensures that the nut 57 will not work off. The piston 54 is urged inward by a compression spring 61 confined between it and the spring seat 45 as shown.

The piston 54 is so dimensioned relatively to the spacing of ports 42 and 43 that when gasket 58 is seated on bead 38 the space outside this bead is connected by port 42, the reduced portion of bushing 36, ports 43, 49 and 51 with passage 52. As soon as piston 54 starts outward, port 43 is blanked by the piston.

Consequently, when piston 54 is in its innermost position, its effective area is limited to the area within bead 38, the annular space outside the bead being vented. As soon as the piston starts to move outward, the entire area of the piston becomes effective. When the piston moves to the outermost position, it seats on gasket 46. Since the piston is gasket-sealed in both limiting positions and moves suddenly between these positions, the piston need have no packing, but need have only a good sliding fit in the bushing.

The operative characteristics of the valve are affected by the characteristics of the triple valves with which it may be used. If we assume that port 52 is always open to atmosphere, valve 19 will close when brake cylinder pressure reaches a definite value, giving a rapid rise of brake cylinder pressure until a certain pressure is attained and then a slow rise to final value (two-stage build-up). If the pressure in passage 52 be varied by any suitable means, the action of piston 54 may be modified to give more than two stages.

While the invention is not strictly limited to the structure shown, certain of the details have valuable operative characteristics. The isolation of the main flow port leading to the brake cylinder from the pressure transmitting port protects the actuating piston from the air rush to the brake cylinder in the early stages of an emergency application. Except for this the spaces 34 and 35 need not be isolated as they are both connected to the brake cylinder. This means that the hub 8 need not fit tightly in the opening in the partition 7. This greatly simplifies manufacture.

The protecting sleeve 13 not only serves as means for holding the valve seat bushing in place, but it also acts as a shroud to protect the valve 22 from disturbing effects of flowing air. The radial ports 14 direct the air against the upstanding valve seat rim 29, and the arrangement illustrated has been found very satisfactory in minimizing the disturbing effect of the air flow upon the valve.

The location of the by-pass through the valve and its stem is a convenient feature, though, obviously, the by-pass might be otherwise located. The essential thing is that there be a by-pass around the valve. By forming the by-pass in the valve it becomes possible to remove the valve and clean the choke port 24 by merely removing the plug 15. Furthermore, the cap nut 23 which carries the choke 24 also holds the various components of the valve in assembled relation. This reduces the number of parts materially.

What is claimed is,—

1. The combination of a body having a flow port adapted for connection with a triple valve, a main flow port adapted for connection with a brake cylinder, and a pressure transmitting port adapted for connection with a brake cylinder, said body having a bore which communicates with both said flow ports, and a second and alined bore communicating therewith and with said pressure transmitting port; a bushing inserted in the first-named bore and serving to isolate said flow ports from each other and substantially to isolate the second-named flow port from said pressure transmitting port, said bushing having a valve seat controlling flow between said flow ports; a valve coacting with said seat, there being a by-pass around said valve from the first named flow port to a port connected with the brake cylinder; a removable closure serving to hold said bushing in sealing relation with said body, the removal of said closure permitting removal of said bushing and valve; yielding means urging said valve in a closing direction; a removable cylinder bushing inserted in the second-named bore and having an open end communicating with said pressure transmitting port; a piston slidable in said bushing and in thrust relation with the said valve; a second removable closure for clamping said cylinder bushing in place; and a spring reacting between said second closure and piston.

2. The combination of a body having a flow port adapted for connection with a triple valve, a main flow port adapted for connection with a brake cylinder, and a pressure transmitting port adapted for connection with a brake cylinder, said body having a bore which communicates with both said flow ports, and a second and alined bore communicating therewith and with said pressure transmitting port; a bushing inserted in the first-named bore and serving to isolate said flow ports from each other and substantially to isolate the second-named flow port from said pressure transmitting port, said bushing having a valve seat controlling flow between said flow ports; a valve coacting with said seat, there being a by-pass around said valve from the first-named flow port to a port connected with the brake cylinder; a removable closure serving to hold said bushing in sealing relation with said body, the removal of said closure permitting removal of said bushing and valve; yielding means urging said valve in a closing direction; a removable cylinder bushing inserted in the second-named bore, having an open end surrounded by a valve seat smaller than the bushing, the open end of said bushing being in communication with said pressure transmitting bore; a piston slidable in said bushing in thrust relation with said valve and having a gasket which seats on the valve seat in the bushing when the piston is in its innermost position; a spring urging said piston in a valve opening direction; a second removable closure holding said cylinder bushing in sealing relation with said body; and means controlled by said piston for venting the space outside the valve seat in the bushing when the piston is seated against said valve seat.

3. The combination of claim 2, further characterized in that the venting means controlled by the piston comprises two ports extending through the bushing, and a connecting port formed by clearance between the body and bushing, said two ports straddling said piston when the piston engages said valve seat, at least one of said ports being blanked by initial movement of the piston away from said valve seat.

4. A valve for controlling flow in an air brake mechanism, comprising a seat member having a raised seat rim, and a surrounding annular sleeve provided with a series of approximately radial ports serving to direct entering air against said seat rim; and a poppet valve adapted to seal against said seat rim.

5. The combination with a body having a bore terminating in a centrally ported partition, of an open-ended cylindrical bushing fitting said bore and entering into sealing relation with said partition, said bushing having a seating rim adjacent the port in said partition and two ports leading through said bushing adjacent the ends thereof and connected with each other externally to the bushing; and a piston working in said bushing controlling flow through the last-named ports, and having a valve portion adapted to coact with said seating rim.

6. The combination with a body having a bore terminating in a centrally ported partition, of an open-ended cylindrical bushing fitting said bore and entering into sealing relation with said partition, said bushing having a seating rim adjacent the port in said partition and two ports leading through said bushing adjacent the ends thereof and connected with each other externally to the bushing; a piston working in said bushing controlling flow through the last-named ports, and having a valve portion adapted to coact with said sealing rim; a combined spring seat and thrust member engaging the end of said bushing remote from said partition; means for holding said member in position; and a spring reacting between said combined spring seat and thrust member and said piston.

7. A build-up controlling valve for air brakes, comprising a shouldered stem member having a longitudinal port extending therethrough; a valve head and gasket mounted on said shouldered stem; and a cap nut threaded on said stem and serving to retain said valve head and gasket thereon, said cap nut being provided with a flow restricting port in communication with the port in said stem.

8. In a device of the class described, the combination of a ported body having alined bores extending from opposite sides thereof, said bores having spaced shoulders between which there is a connecting passage of less diameter; a combined valve seat and valve guiding bushing seated against the shoulder in one of said bores, and having a valve guiding portion which fills said reduced passage; a closure holding said combined valve seat and bushing in sealing relation with said body; a flow controlling valve guided in the guiding portion of said bushing and coacting with said seat, said valve including a stem which extends inward through and projects beyond said guiding portion; a cylinder bushing mounted in the other of said bores against the shoulder therein, the cylinder bushing having a valve seat surrounding an opening through its inner end; a closure holding the cylinder bushing in sealing relation with said body; a combined piston and valve in the cylinder bushing in thrust relation with the stem of said flow controlling valve; and a spring urging said piston into thrust engagement with the stem of said flow controlling valve to unseat the flow controlling valve, and seat the combined piston and valve on the seat in the cylinder bushing.

9. In a device of the class described, the combination of a ported body having alined bores extending from opposite sides thereof, said bores having spaced shoulders between which there is a connecting passage of less diameter; a combined valve seat and valve guiding bushing seated against the shoulder in one of said bores; and having a valve guiding portion which fills said reduced passage; a closure holding said combined valve seat and bushing in sealing relation with said body; a flow controlling valve guided in the guiding portion of said bushing and coacting with said seat, said valve including a stem which extends inward through and projects beyond said guiding portion; a cylinder bushing mounted in the other of said bores against the shoulder therein, the cylinder bushing having a valve seat surrounding an opening through its inner end; a closure holding the cylinder bushing in sealing relation with said body; a combined piston and valve in the cylinder bushing in thrust relation with the stem of said flow controlling valve; a spring urging said piston into thrust engagement with the stem of said flow controlling valve to unseat the flow controlling valve, and seat the combined piston and valve on the seat in the cylinder bushing; and a second but weaker spring urging said flow controlling valve in a closing direction.

10. The combination defined in claim 8, in which the combined valve seat and valve guiding bushing is provided with a radially ported skirt which surrounds the flow controlling valve, and the cylinder bushing is provided with bypass ports which straddle the combined piston and valve when the latter is in its innermost position, said ports being connected together by a clearance space between the bushing and the body.

11. The combination defined in claim 8, in which the flow controlling valve is provided with a bypass port extending through its stem, and the valve proper and stem are constructed as separate parts and connected together by a nut threaded on the stem and provided with a flow restricting choke communicating with the bypass passage in the stem.

CHARLES A. CAMPBELL.